(12) United States Patent
Van Der Linde (10) Patent No.: US 10,172,328 B2
(45) Date of Patent: Jan. 8, 2019

(54) TRANSPORT SYSTEM AND A METHOD FOR TRANSPORTING LIVESTOCK

(71) Applicant: Heering Group B.V., Vaassen (NL)

(72) Inventor: Gerrit Van Der Linde, Vaassen (NL)

(73) Assignee: HERRING GROUP B.V., Vaassen (NL)

( * ) Notice: Subject to any disclaimer, the term of this patent is extended or adjusted under 35 U.S.C. 154(b) by 396 days.

(21) Appl. No.: 14/894,790

(22) PCT Filed: May 27, 2014

(86) PCT No.: PCT/NL2014/050336
§ 371 (c)(1),
(2) Date: Nov. 30, 2015

(87) PCT Pub. No.: WO2014/193227
PCT Pub. Date: Dec. 4, 2014

(65) Prior Publication Data
US 2016/0106073 A1 Apr. 21, 2016

(30) Foreign Application Priority Data

May 31, 2013 (NL) .................................... 2010899

(51) Int. Cl.
*B60P 3/04* (2006.01)
*A01K 45/00* (2006.01)
(Continued)

(52) U.S. Cl.
CPC .......... *A01K 45/005* (2013.01); *A01K 1/0035* (2013.01); *A01K 29/00* (2013.01); *B60P 3/04* (2013.01)

(58) Field of Classification Search
CPC ........ A01K 1/0035; A01K 45/005; B60P 3/04
(Continued)

(56) References Cited

U.S. PATENT DOCUMENTS

| 533,721 A | * | 2/1895 | Mockridge | ............... B60P 3/04 |
| | | | | 119/401 |
| 1,520,504 A | * | 12/1924 | Mudd | ..................... B61D 3/163 |
| | | | | 119/401 |

(Continued)

FOREIGN PATENT DOCUMENTS

| DE | 16 30 994 | 7/1971 |
| EP | 1361090 | 11/2003 |

OTHER PUBLICATIONS

International Search Report issued in PCT/NL14/50336 dated Aug. 22, 2014.
International Preliminary Report issued in PCT/NL14/50336 dated Mar. 27, 2015.

*Primary Examiner* — David J Parsley
(74) *Attorney, Agent, or Firm* — Dann, Dorfman, Herrell and Skillman; Stephen Eland (57) ABSTRACT

The invention relates to a transport system and a method for transporting livestock, in particular poultry such as chicks, wherein the transport system includes a transport compartment with an air entry side and an air exit side. The transport system further includes a ventilation system for supplying air to the transport compartment at the air entry side. The transport system is provided with positioning elements which are arranged for receiving and holding a plurality of boxes for the livestock in a transport position in the transport compartment between the air entry side and the air exit side of the transport compartment. The positioning elements are arranged to hold and position the boxes in the transport position in which the boxes form a first row and a second row that converge towards each other in a direction from the air entry side towards the air exit side of the transport compartment.

17 Claims, 9 Drawing Sheets

(51) Int. Cl.
*A01K 1/00* (2006.01)
*A01K 29/00* (2006.01)

(58) Field of Classification Search
USPC .............................. 119/400, 401, 403, 412
See application file for complete search history.

(56) References Cited

U.S. PATENT DOCUMENTS

| | | | | |
|---|---|---|---|---|
| 1,694,732 | A * | 12/1928 | Cohen | B61D 3/163 |
| | | | | 119/401 |
| 2,612,027 | A | 9/1952 | McGan | |
| 3,940,174 | A * | 2/1976 | Mayes | B60P 3/04 |
| | | | | 119/401 |
| 4,084,714 | A * | 4/1978 | Williams | A01K 45/005 |
| | | | | 119/401 |
| 4,454,837 | A * | 6/1984 | Luebke | B60P 3/04 |
| | | | | 119/401 |
| 4,481,870 | A | 11/1984 | Smith | |
| 6,450,133 | B1 * | 9/2002 | Bernard | F01P 5/04 |
| | | | | 123/2 |
| 6,581,544 | B1 * | 6/2003 | Smith | B60P 3/04 |
| | | | | 119/401 |
| 6,817,316 | B1 * | 11/2004 | Roussy | B60P 3/20 |
| | | | | 119/401 |
| 8,794,187 | B2 * | 8/2014 | Smith | B60P 3/04 |
| | | | | 119/401 |
| 2006/0234620 | A1 * | 10/2006 | Mennen | B60P 3/04 |
| | | | | 454/118 |

* cited by examiner

TRANSPORT SYSTEM AND A METHOD FOR TRANSPORTING LIVESTOCK

BACKGROUND

The invention relates to a transport system and a method for transporting livestock, in particular poultry such as chicks.

The transport of day old chicks from a hatchery to a farm plays a critical role in their subsequent performance. Hatcheries operate in a fully controlled indoor environment, while transport entails the risk of exposing the chicks to uncontrolled, outdoor conditions. If the chicks are not protected from unpredictable changes to their climate their performance is directly impaired. High temperatures can cause increased water loss, with the risk of dehydration. When exposed to low temperatures, the chicks are forced to use their own reserves, thereby reducing their growth rate. It is therefore of great importance to provide an optimized transport environment, to ensure that the birds arrive at the farm in the same condition in which they left the hatchery.

Known transport systems are provided with a transport compartment for holding boxes in which the day old chicks are accommodated. The boxes are stored in parallel rows extending in the longitudinal direction of the transport compartment. The known transport systems are provided with ventilation systems which generate an airflow passing in between the rows of boxes in the longitudinal direction of the transport compartment. An example of such a transport system is disclosed in U.S. Pat. No. 4,481,870 A. A disadvantage of these known transport systems is that the air merely flows past the boxes, rather than passing through the boxes. Additionally, the quality of the air arriving at the boxes that are most distant from the ventilation system is poor, as it is already used and heated up during its propagation through the transport compartment.

Improvements in the known transport systems are mainly focused on increasing the volume of the airflow by using high-power fans. Such high-power fans require a separate generator, require more and complex maintenance and are subject to failure. Other improvements are related to intermediate cooling of the airflow, for example by partitioning the transport compartment with air permeable cooling walls, such as in DE 16 30 994 A1, which discloses a transport compartment for pigeons. These air permeable walls however significantly increases the counter pressure that has to be overcome by the ventilation system.

U.S. Pat. No. 2,612,027 A discloses a double decked stock truck cooling and ventilating system. The truck is provided with a lower deck for small animals, such as sheep. A ventilating and cooling unit is arranged for supplying air at a front panel and discharging air through a rear grill. The lower deck forms a single, undivided compartment for holding small animals. As such, the problem of creating an optimal airflow through rows of boxes does not occur. Furthermore, U.S. Pat. No. 2,612,027 A does not disclose any means for positioning rows of boxes during transport.

It is an object of the present invention to provide a transport system and a method for transporting livestock, in particular poultry such as chicks, wherein the transport environment can be optimized.

SUMMARY OF THE INVENTION

According to a first aspect, the invention provides a transport system for transporting livestock, in particular poultry such as chicks, wherein the transport system comprises a transport compartment with an air entry side and an air exit side, wherein the transport system further comprises a ventilation system for supplying air to the transport compartment at the air entry side, wherein the transport system is provided with positioning elements which are arranged for receiving and holding a plurality of boxes for said livestock in a transport position in the transport compartment between the air entry side and the air exit side of the transport compartment, wherein the positioning elements are arranged to hold and position the boxes in the transport position in which the boxes form a first row and a second row that converge towards each other in a direction from the air entry side towards the air exit side of the transport compartment.

When the air travels from the air entry side in the direction of convergence between the two rows of boxes towards the air exit side, a part of the volume of the air passes through the boxes closest to the air entry side. Thus, as the remaining air reaches the more distant boxes with respect to the air entry side, the volume of the airflow is gradually reduced. However, due to the convergence between the two rows of boxes, the volume between the two rows of boxes in the direction of convergence can be reduced as well, thereby compensating for the reduction in volume of the airflow. Therefore, the pressure of the airflow can be kept substantially constant or at substantially the same level along the direction of convergence. Thus, the airflow can reach the more distant boxes with respect to the air entry side, and can additionally ventilate said more distant boxes equally well as the closer boxes. Thus, an optimized transport environment can be provided.

In an embodiment the boxes are arranged to be permeable to air, wherein, in the transport position, the boxes form the main passageway for the air to flow from the air entry side to the air exit side of the transport compartment. Thus, the air from the air entry side can be made to flow through the boxes to reach the air exit side, instead of flowing past the boxes such as in a conventional transport system.

In an embodiment the two rows of boxes, in the transport position, at least partly define an air entry chamber in-between them that tapers in the direction from the air entry side towards the air exit side of the transport compartment, wherein the ventilation system is provided with an air inlet that is arranged to direct air into the air entry chamber. The air can travel through the air entry chamber and propagate through the adjoining boxes to the air exit side.

In an embodiment the air inlet of the ventilation system is arranged to direct air into the air entry chamber in the direction of convergence of the two rows of boxes. In this manner, more air can reach the boxes that are the furthest from the air entry side.

In an embodiment the transport compartment is provided with substantially air-tight sealing elements for substantially sealing off remaining gaps between the air entry chamber and the air exit side, apart from where the boxes define the air entry chamber. The sealing elements can reduce or prevent the escape of air from the air entry chamber to the air exit side via other routes than the boxes. Thus, an effective utilization of the air in the air entry chamber can achieved.

In an embodiment the rows are arranged in a V-shaped transport position, preferably a mirror-symmetrical V-shaped transport position. By arranging the boxes in rows according to a V-shaped transport position, the air can be evenly distributed over the boxes of both rows.

In an embodiment the transport system comprises an elongate transport body that defines the internal space of the transport compartment, wherein the rows of boxes extend under mutually opposite, oblique angles with respect to the longitudinal direction of the transport body. The boxes can thus be positioned with respect to the longitudinal direction of the body, so that an even distribution of boxes in the longitudinal direction of the transport body can be achieved.

In an embodiment the transport body is substantially mirror-symmetrical about an upright mirror-symmetrical plane extending in the longitudinal direction of the transport body, wherein the first row and the second row are mirror-symmetrically arranged on opposite sides of the mirror-symmetrical plane of the transport body. The boxes can thus be positioned symmetrically on both sides of the mirror-symmetrical plane in order to achieve an even distribution of boxes over the width of the transport body.

In an embodiment the angle of convergence between the rows of boxes, in the transport position, is in the range of five to twenty-five degrees, and preferably in the range of eight to fifteen degrees. The specified range can provide the appropriate decrease of volume between the rows of boxes to compensate for the gradual decrease in volume of the airflow as the air propagates in the direction of convergence. Additionally, such a sharp angle of convergence allows for the boxes to be placed along a substantial part of the length of the transport body, while remaining compact in a direction perpendicular to the longitudinal direction of the transport body.

In an embodiment the positioning elements comprise a first guide and a second guide arranged in a mutually parallel and spaced apart relationship and a third guide and a fourth guide arranged in a mutually parallel and spaced apart relationship, wherein the first guide and the second guide define a first guideway for receiving the first row of boxes and wherein the third guide and the fourth guide define a second guideway for receiving the second row of boxes. The guides can guide the boxes into and from the transport position during loading and unloading.

In an embodiment the boxes are arranged to be placed on trolleys, wherein each trolley is provided with a platform which is dimensioned to substantially seal off the guideways at the position of trolleys, wherein the guideways are arranged for, in cooperation with said trolleys, forming a return channel through which air can be returned from the air exit side to the air entry side. The platforms of the trolleys can support the boxes at a distance from the bottom of the transport compartment, thereby leaving a space underneath the boxes for air to pass through. The guides can be arranged to cooperate with said platform, such that a substantially air-tight air return channel can be formed through the guideways between the respective guides and the platforms of the subsequent trolleys.

In an embodiment the guides are detachably mounted, wherein, after removal of the guides, the transport compartment is left with a substantially flat bottom surface. The flat bottom surface is less likely to collect dirt and contaminations and can be easily and hygienically cleaned.

In an embodiment the transport system comprises a transport body that defines the internal space of the transport compartment, wherein the transport body is arranged to be placed on a chassis of a transport vehicle, wherein the transport body comprises, with respect to the forward driving direction of the transport vehicle, a front wall, a rear wall and mutually parallel sidewalls extending between the front wall and the rear wall, wherein the air entry side of the transport compartment is located at or near the front wall and wherein the air exit side of the transport compartment is located at or near the rear wall. In this manner, during a forward driving movement, air can be passively collected as so called 'free ventilation' via the air entry side facing in the forward driving direction. The drag behind the transport vehicle can automatically draw air from the air exit side of the transport compartment, thereby further reducing the amount of energy required to achieve the ventilation.

In an embodiment the air inlet is arranged at or near the air entry side of the transport compartment, wherein the transport system is provided with an air inlet flap, wherein the inlet flap is moveable between an open and closed position for opening and closing the air inlet, wherein, in the closed position, the upper surface of the air inlet flap lies substantially flush with the top of the transport compartment. This can reduce the drag generated by the air inlet flap when in the closed position, for example when compared to the conventional butterfly valves.

In an embodiment the air inlet flap has a leading edge which is arranged to face into the forward driving direction of the transport vehicle, wherein the bottom surface of the air inlet flap is provided with a chamfer towards the leading edge of the inlet flap to reduce the drag of the leading edge in the forward driving direction.

In an embodiment, the transport system is further provided with a first air outlet and a second air outlet for drawing air from the air exit side of the transport compartment, wherein the air outlets are shaped as elongated openings in the sidewalls, wherein the elongated openings extend vertically between the bottom and the top of the transport compartment over a substantial part of the height of the transport compartment, and preferably over substantially the entire height of the transport compartment. The vertical orientation of the air outlets allows for air to be drawn from the transport compartment as a substantially laminar airflow.

In an embodiment the sidewalls define the outer width of the transport body, and wherein, at the transition from the sidewalls to the rear wall, the transport body is provided with surfaces that taper inwards with respect to the width of the transport body. Such inwardly tapering surfaces can reduce the drag behind the transport body and provide an increase in the aerodynamic efficiency of the transport body.

In an embodiment the transport system is further provided with a first air outlet and a second air outlet for drawing air from the air exit side of the transport compartment, wherein the air outlets are positioned at the inwardly tapering surfaces of the transport body. In conventional transport systems, the air outlets are arranged in the top and/or the bottom of the transport compartment, which entails the risk of precipitation or toxic gasses accidentally entering the transport compartment due to for example turbulence. By arranging the air outlets at the inwardly tapering surfaces of transport body, the abovementioned risks can be significantly reduced or even eliminated. In addition, transport vehicles are usually provided with an additional cantilever tail lift which, during driving, is raised in the vertical plane and lies substantially flush against the access doors in the rear wall. Due to the position of the tail lift, any ventilation exiting through the rear of the transport compartment is obstructed. By arranging the air outlets and their outlet flaps at the inwardly tapering surface to the sides of the rear wall, they can be arranged outside of the external dimensions of the tail lift, such that the air can be freely discharged through the air outlets.

In an embodiment the transport system comprises a first outlet flap and second outlet flap at the first air outlet and the second air outlet, respectively, wherein the first outlet flap and the second outlet flap are moveable between an open and closed position for opening and closing the respective air outlets, wherein, in the open position, the outlet flaps are fully comprised within the outer width of the transport body. Since the sidewalls form the widest part of the transport system, the risk of damage or injuries caused by protruding outlet flaps can be reduced.

According to a second aspect, the invention provides a transport vehicle, in particular a truck, comprising a chassis and the aforementioned transport system mounted on top of said chassis.

According to a third aspect, the invention provides a method for transporting livestock, in particular poultry such as chicks, in a transport system, wherein the transport system comprises a transport compartment with an air entry side and an air exit side, wherein, during transport, the method comprises the step of holding a plurality of boxes for said livestock in a transport position in the transport compartment between the air entry side and the air exit side of the transport compartment, wherein, in the transport position, the boxes are held in a first row and a second row that converge towards each other in a direction from the air entry side towards the air exit side of the transport compartment.

When the air travels from the air entry side in the direction of convergence between the two rows of boxes towards the air exit side, a part of the volume of the air passes through the boxes closest to the air entry side. Thus, as the remaining air reaches the more distant boxes with respect to the air entry side, the volume of the airflow is gradually reduced. However, due to the convergence between the two rows of boxes, the volume between the two rows of boxes in the direction of convergence can be reduced as well, thereby compensating for the reduction in volume of the airflow. Therefore, the pressure of the airflow can be kept substantially constant or at substantially the same level along the direction of convergence. Thus, the airflow can reach the more distant boxes with respect to the air entry side, and can additionally ventilate said more distant boxes equally well as the closer boxes. Thus, an optimized transport environment can be provided.

In an embodiment the method comprises the step of providing an airflow through the transport compartment, wherein the airflow is directed through the boxes in a transverse direction with respect to the direction of convergence of the two rows. The distance travelled through the boxes in the transverse direction can be kept relatively small. Thus, the airflow only has to pass through a limited number of boxes and can remains reasonably fresh and without a significant increase in temperature throughout its passage. The airflow can therefore be more effectively utilized for ventilation of the livestock in the boxes.

In an embodiment, in the transport position, the two rows of boxes at least partly define an air entry chamber in-between them that tapers in the direction from the air entry side towards the air exit side of the transport compartment, wherein the method comprises the step of supplying air to the air entry chamber, wherein the boxes are the main passageway for the air to flow from the air entry side to the air exit side of the transport compartment. Thus, the air from the air entry side can be made to flow through the boxes to reach the air exit side, instead of flowing past the boxes such as in a conventional transport system.

In an embodiment the method further comprises the step of sealing off gaps between the air entry chamber and the air exit side of the transport compartment, apart from where the boxes define the air entry chamber. The air can travel through the air entry chamber and propagate through the adjoining boxes to the air exit side.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
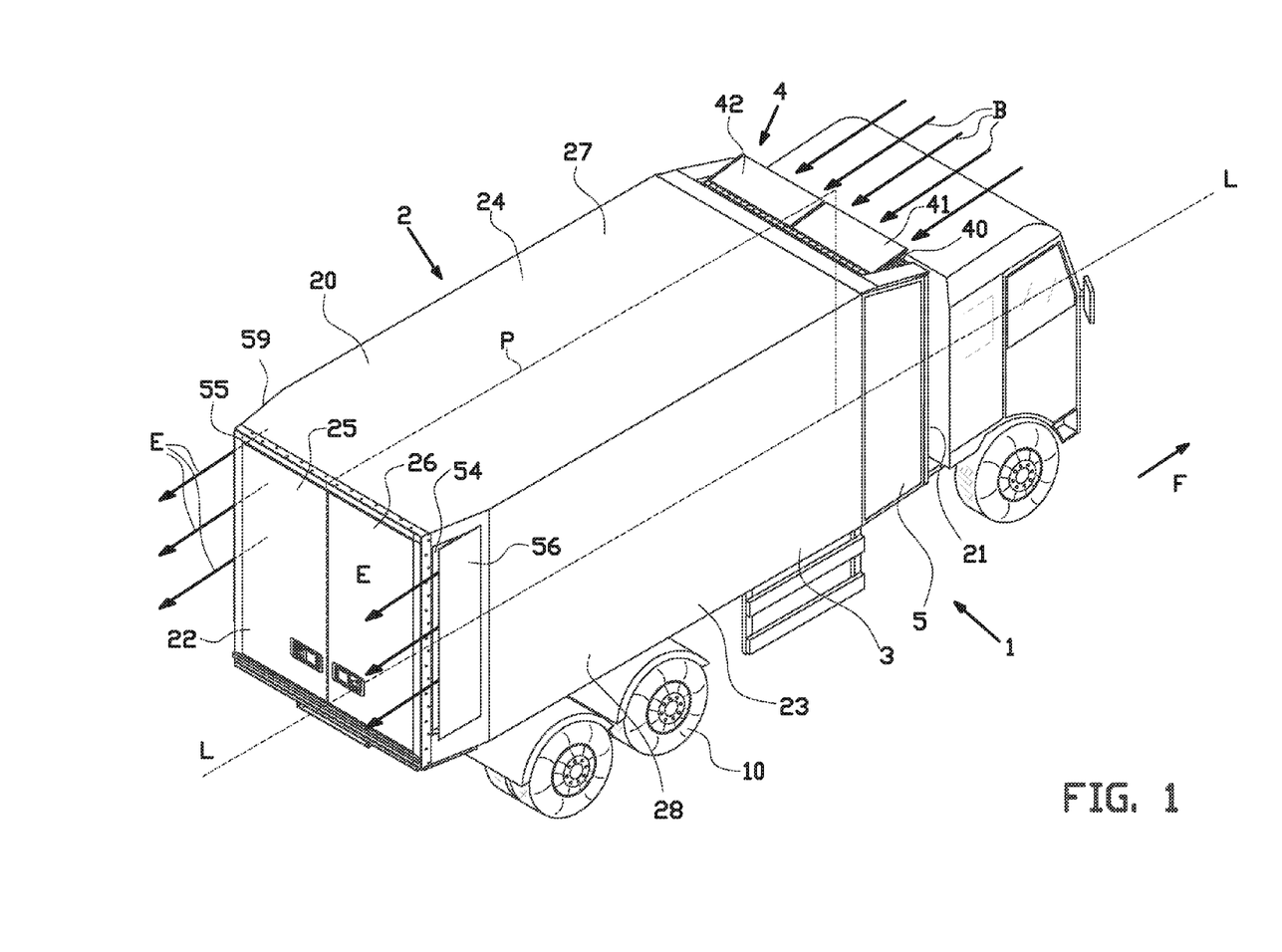
FIG. 1 shows an isometric view of a transport vehicle with a transport system according to an exemplary embodiment of the invention.

FIG. 1 shows a transport vehicle, in particular a truck 1, provided with a transport system 2 for transporting livestock, in particular poultry such as day-old chicks, according to an exemplary embodiment of the invention. As shown in FIGS. 2-7, the transport system 2 comprises a transport environment or compartment 3 for holding the livestock during transit and a ventilation system 4 for supplying, conditioning, recirculating and discharging air that is used to ventilate and control the environmental conditions within the transport compartment 3. Each of these components will be described in more detail hereafter.

As shown in FIG. 1, the truck 1 is provided with a chassis 10 and a cabin 11 arranged at the front of the chassis 10. The truck 1 has a forward driving direction F. The transport system 2 comprises an elongated, substantially box-shaped transport trailer, housing or body 20 with an outer width X and a longitudinal direction L. The transport body 20 can be provided in different lengths, in the range of approximately five meters up to or exceeding fourteen meters. Depending on the length, the transport body 20 can accommodate approximately 25.000 up to 150.000 day old chicks. The transport body 20 is mirror-symmetrical about an upright or vertical mirror-symmetrical plane P extending in the longitudinal direction L of the transport body 20. The transport body 20 is arranged on top of the chassis 10 of the truck 1, behind the cabin 11 with respect to the forward driving direction F.

The transport body 20 comprises, with respect to the forward driving direction F, a front wall 21, a rear wall 22 and two substantially parallel sidewalls 23, 24 extending between the front wall 21 and the rear wall 22. The two sidewalls 23, 24 define the outer width X of the transport body 20. The rear wall 22 is provided with access doors 25, 26 that provide access to the inside of the transport body 20. The transport body 20 further comprises a substantially flat roof or top 27 and a substantially flat floor or bottom 28.

FIGS. 2-4A show the transport system 2 according to FIG. 1 in more detail. The rear wall 22, part of one of the sidewalls 23 and part of the top 27 have been schematically cut away to reveal the inside arrangement of the transport system 2. As shown, the transport body 20 defines an internal space which, at a short distance from the front wall 22, is split up by an intermediate wall 29 that extends substantially parallel to the front wall 22. The transport compartment 3 is located between the intermediate wall 29 and the rear wall 23. The remaining space between the intermediate wall 29 and the front wall 22 is reserved as a machine chamber 5 for dedicated machinery, power generators and, for the purpose of ventilation, components of the ventilation system 4.

The transport compartment 3 is arranged for receiving and holding a plurality of crates, containers or boxes 8 in a V-shaped transport position V within the transport compartment 3. The boxes 8 are arranged for accommodating the livestock during transit. The boxes 8 are provided with openings in the sides and optionally the bottom such that the boxes 8 are permeable to air. In this example, the boxes 8 are placed on platforms 90 of trolleys 9 and are stacked on top of each other to form columns or stacks 80. The trolleys 9 are placed in line such that the stacks 80 of boxes 8 form rows 81, 82, wherein each row 81, 82 forms a leg of the V-shaped transport position V. One trolley 9 can carry multiple stacks 80. Alternatively, the boxes 8 can also be arranged in frames or other means for loading and/or unloading said boxes 8.

Figure 7:
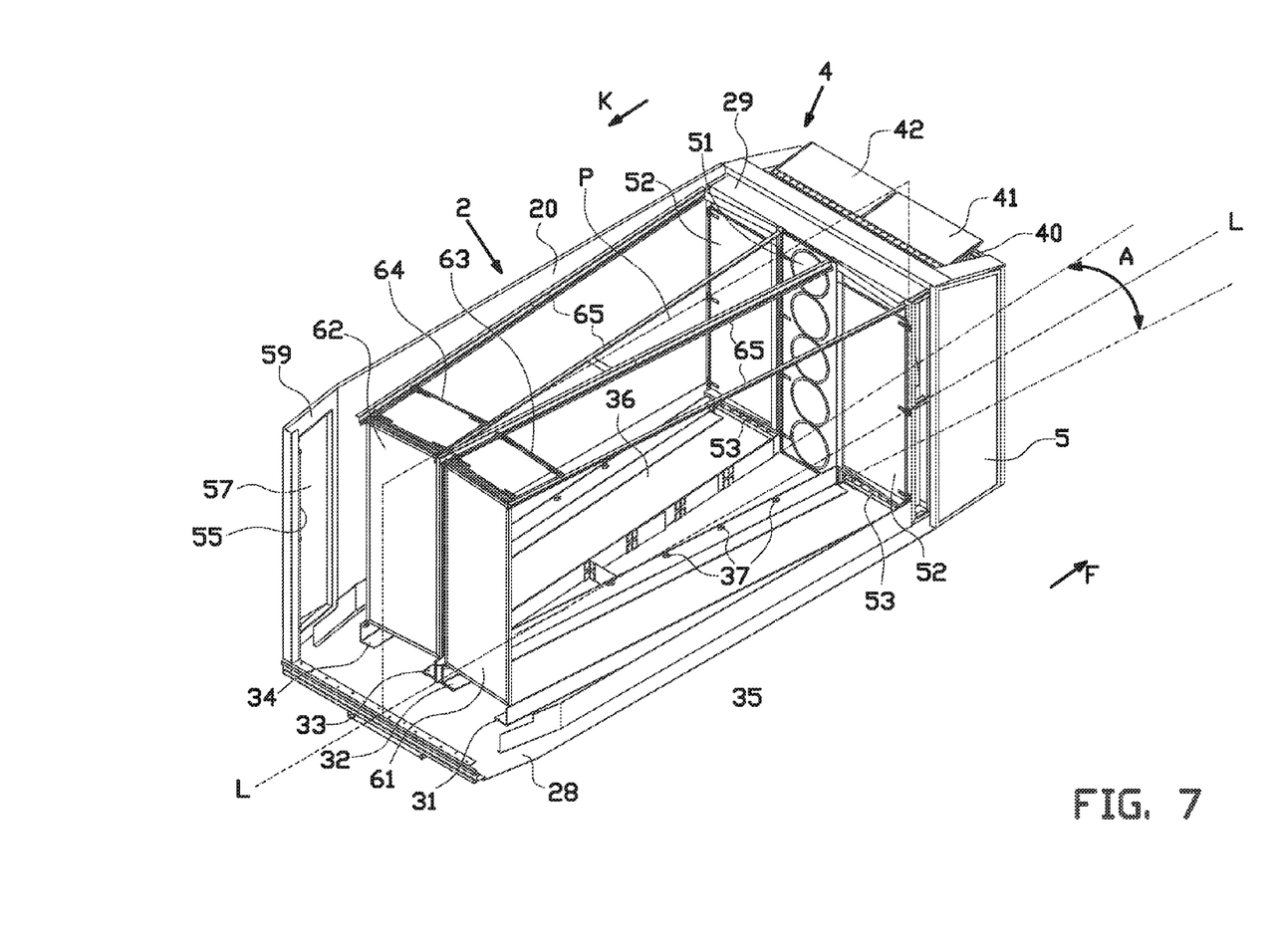
FIG. 7 shows an isometric view of the transport system of FIG. 2 in a completely unloaded situation.

As shown in FIG. 7, the transport system 2 is provided with positioning elements 30 inside the transport compartment 3 for receiving, positioning and holding the boxes 8 in the transport position V specific for the invention. In this exemplary embodiment, the positioning elements 30 comprise a first guide 31, a second guide 32, a third guide 33 and a fourth guide 34 in the form of elongated, continuous linear profiles made of metal, that stand up from the bottom 28 of the transport body 20.

The first guide 31 and the second guide 32 extend over the bottom 20 of the transport body 20 in a parallel, spaced apart relationship with respect to each other, under an oblique and preferably sharp angle with respect to the longitudinal direction L of the transport body 20. The third guide 33 and the fourth guide 34 also extend over the bottom 20 of the transport body 20 in a parallel, spaced apart relationship with respect to each other, under an oblique and preferably sharp angle with respect to the longitudinal direction L of the transport body 20, yet opposite to the angle of the first guide 31 and the second guide 32. The first guide 31 and the second guide 32 converge towards the third guide 33 and the fourth guide 34 in a direction of convergence K from the front wall 21 towards the rear wall 22 of the transport body 20 so as to be mutually in a substantially V-shaped configuration corresponding to the V-shaped transport position V. In particular, the second guide 32 and the third guide 33 converge into a single point to form a closed V-shape. The first guide 31 and the fourth guide 34 are shortened to substantially the length of the second guide 32 and the third guide 33.

In this particular embodiment, the oblique angle of the guides 31-34 with respect to the longitudinal direction L of the transport body 20 is approximately five degrees, such that the angle of convergence A of the V-shaped configuration is approximately ten degrees. Preferably, the angle of convergence A of the V-shaped configuration lies in the range of five to twenty degrees, and most preferably eight to fifteen degrees.

In the exemplary embodiment as shown in FIG. 7, the first guide 31 and the second guide 32 are arranged on one side of the mirror-symmetrical plane P of the transport body 20. The third guide 33 and the fourth guide 34 are arranged mirror-symmetrically with respect to the first guide 31 and the second guide 34 about the mirror-symmetrical plane P of the transport body 20. The first guide 31 and the second guide 32 on the one side of the mirror-symmetrical plane P and the third guide 33 and the fourth guide 34 on the opposite side of the mirror-symmetrical plane P thus form a symmetrical V-shape about the same mirror-symmetrical plane P.

Figure 2:
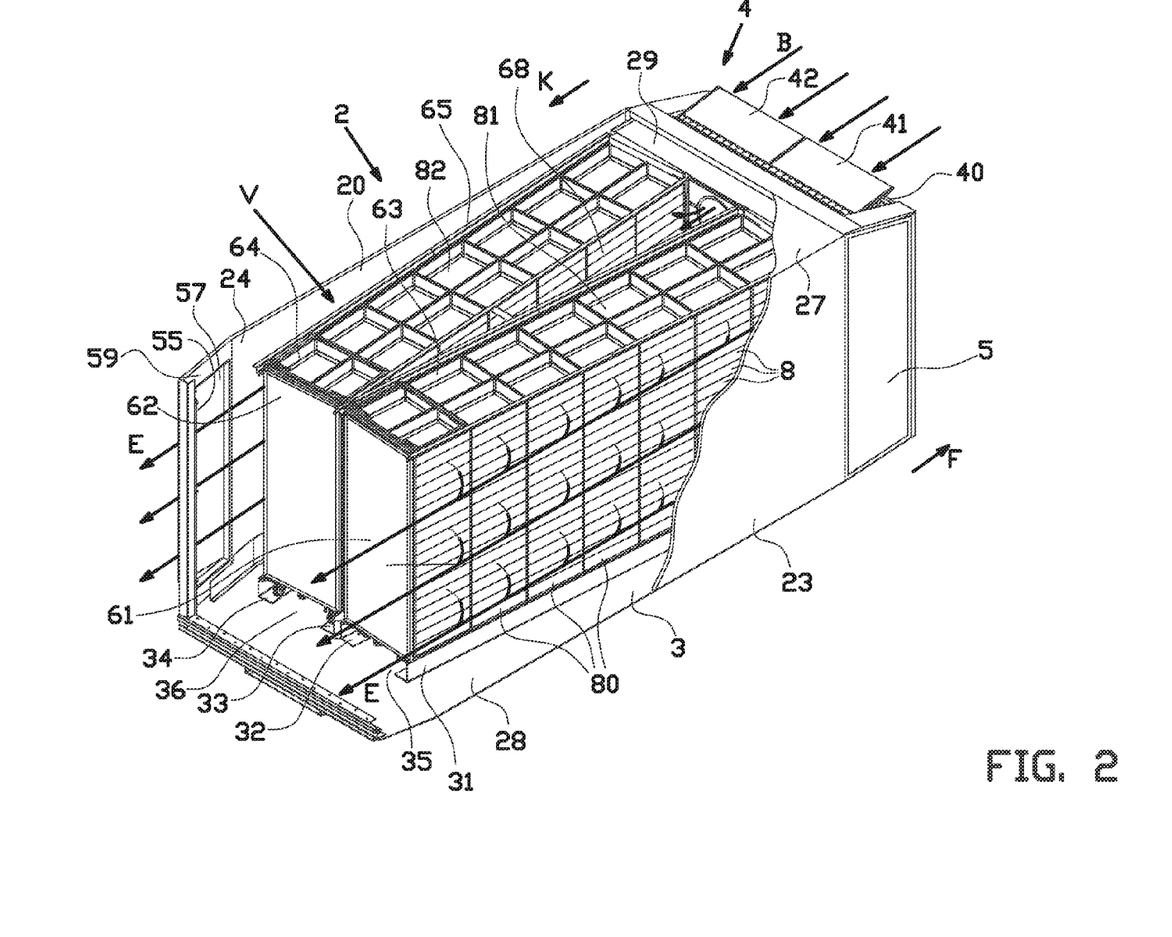
FIG. 2 shows an isometric view of the transport system of FIG. 1, wherein part of the transport system has been cut away to reveal the inner parts of the transport system.

The first guide 31 and the second guide 32 define a first track, corridor or guideway 35, as shown in FIG. 7, for receiving the first row 81 of boxes 8 on trolleys 9 as shown in FIG. 2. The third guide 33 and the fourth guide 34 define a second track, corridor or guideway 36, as shown in FIG. 7, for receiving the second row 82 of boxes 8 on trolleys 9 as shown in FIG. 2. The guideways 35, 36 are under the oblique angles of their respective guides 31-34 and thus form the same substantially V-shaped configuration as defined by the guides 31-34. The space between the first guide 31 and the second guide 32 is such that they allow for trolleys 9 to pass in between to form a first, single line of trolleys 9 in the longitudinal direction of the first guideway 35. Similarly, the space between the third guide 33 and the fourth guide 34 is such that they allow for trolleys 9 to pass in between to form a second, single line of trolleys 9 in the longitudinal direction of the second guideway 36.

Each guide 31-34 is provided with a plurality of securing elements 37 in the form of protrusions that extend into the respective guideways 35, 36. The securing elements are provided with suitable fasteners for mating with fasteners provided on the trolleys 9. An example of a set of fasteners is a pin and hole connection. The securing elements 37 are equally distributed along the length of the guides 31-34, preferably at an intermediate distance such that for each trolley 9 in the guideway 35, 36, at least one securing element 37 is provided. In this manner, each trolley 9 can be positioned and securely fixed to one or more of the securing elements 37 of the respective the guideway 35, 36.

Although the positioning elements 30 have been described above as a plurality of guides 31-34 with securing elements 37, it will be apparent to the person skilled in the art that any alternative positioning elements arranged to hold the boxes 8 in the V-shaped transport position V of the invention, would be encompassed by the scope of the present invention. Examples of such alternative positioning elements are integrated guideways in the top 27 or bottom 28 of the transport body 20 or positioning frames extending along the intended transport position V of the boxes 8.

Figure 5:
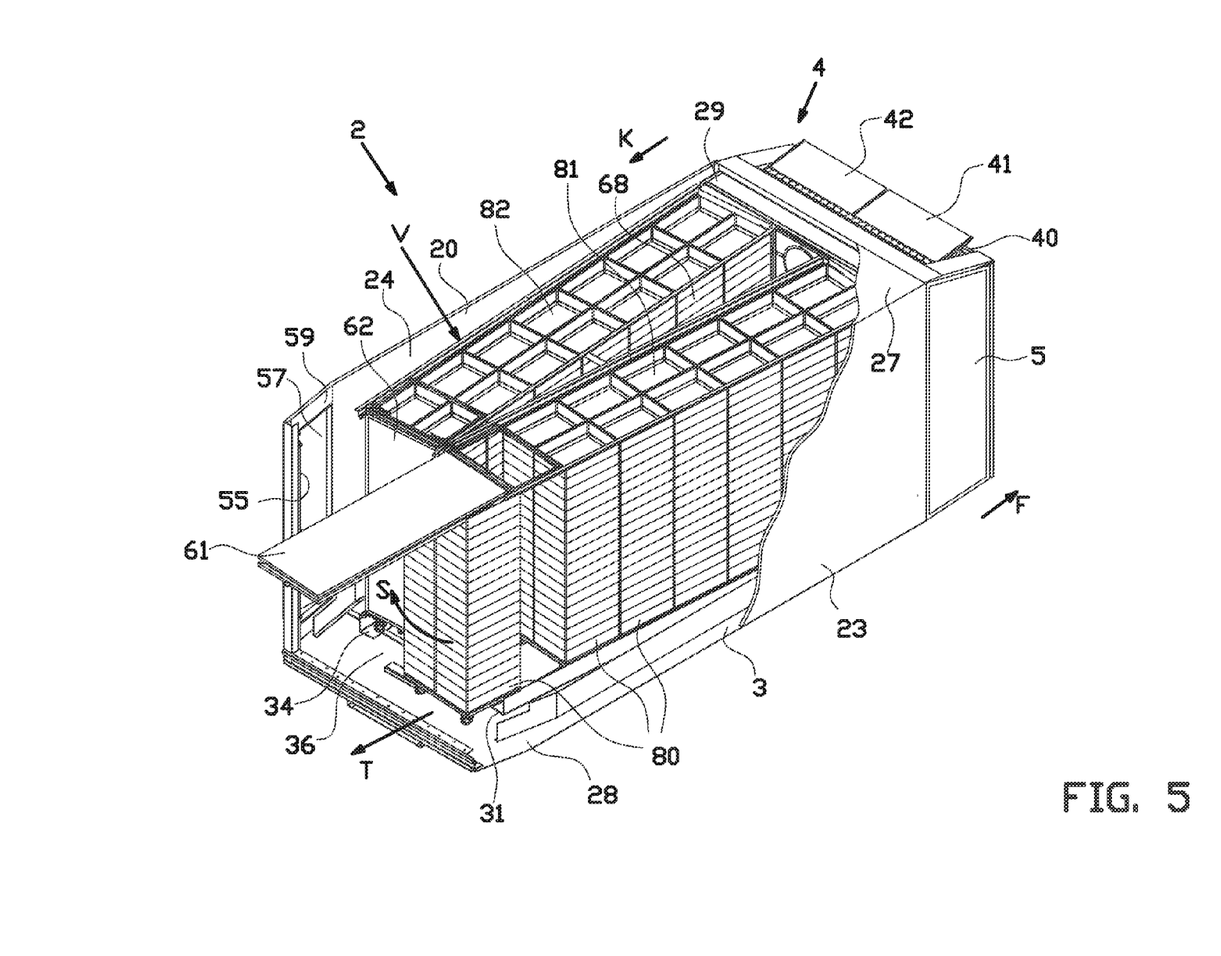
FIG. 5 shows an isometric view of the transport system of FIG. 2 during loading or unloading.

As shown in FIGS. 5 and 7, the transport system 2 is further provided with a first securing panel or door 61 and a second securing panel or door 62 which are arranged within the transport compartment 3 overhead the first guideway 35 and the second guideway 36, respectively. The securing doors 61, 62 are rotatably coupled to carriages 63, 64. The carriages 63, 64 are slidably arranged on rails 65 that run along the top 27 of the transport body 20 in the longitudinal directions of the respective guideways 35, 36. The carriages 63, 64 allow for the securing doors 61, 62 to be displaced in the longitudinal directions of the respective guideways 35, 36 into a position in which they abut the leading trolley 9 with respect to the rear wall 22 of the transport body 20 and the boxes 8 supported on said trolley 9. As shown in FIG. 5, the securing doors 61, 62 can be tilted in a rotation direction S with respect to the carriages 63, 64 from a vertical position into a horizontal position substantially parallel to the top 27 of the transport body 20, to allow the trolleys 9 to be loaded or unloaded in a loading or unloading direction T from the guideways 35, 36.

Figure 3:
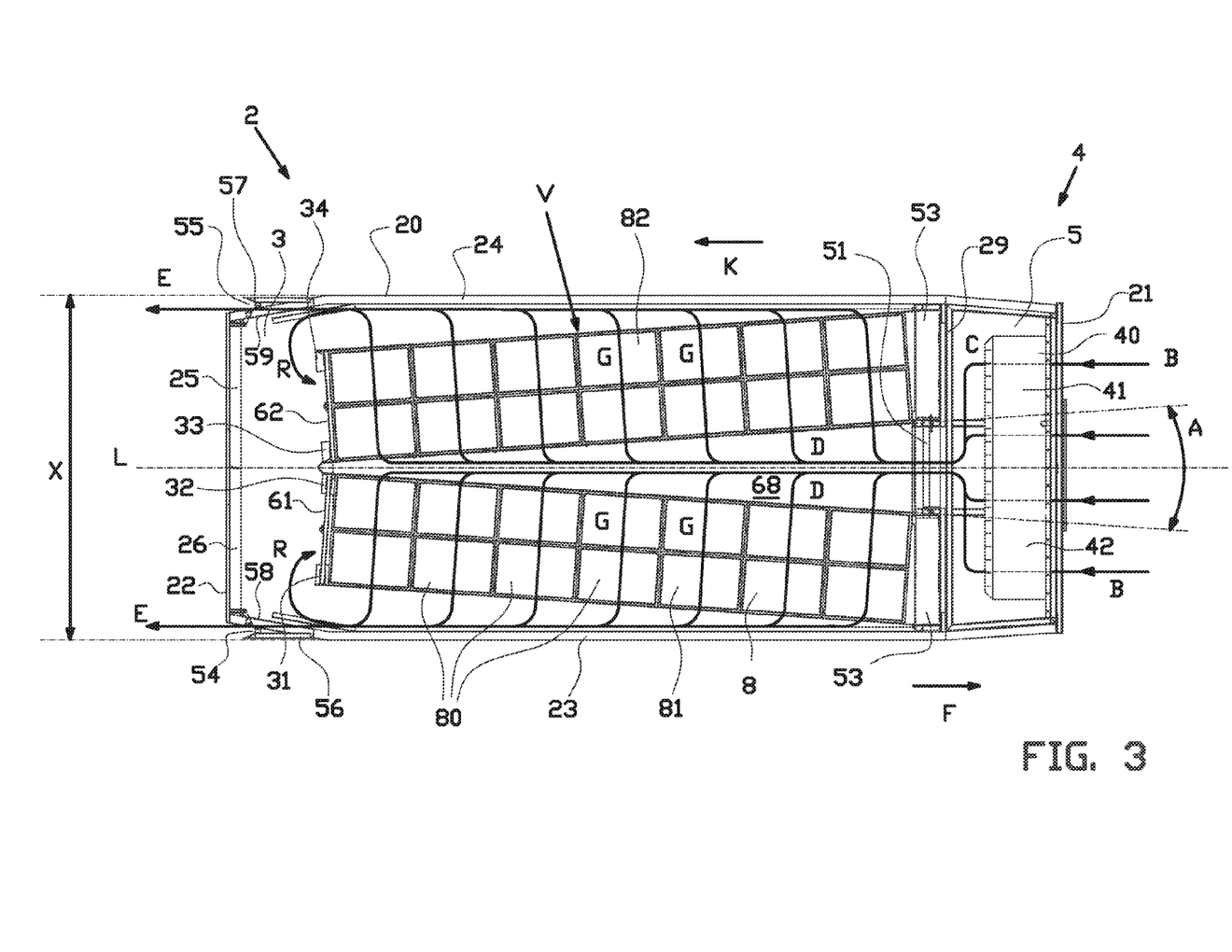
FIG. 3 shows a top view of the transport system of FIG. 2.
Figure 4A:
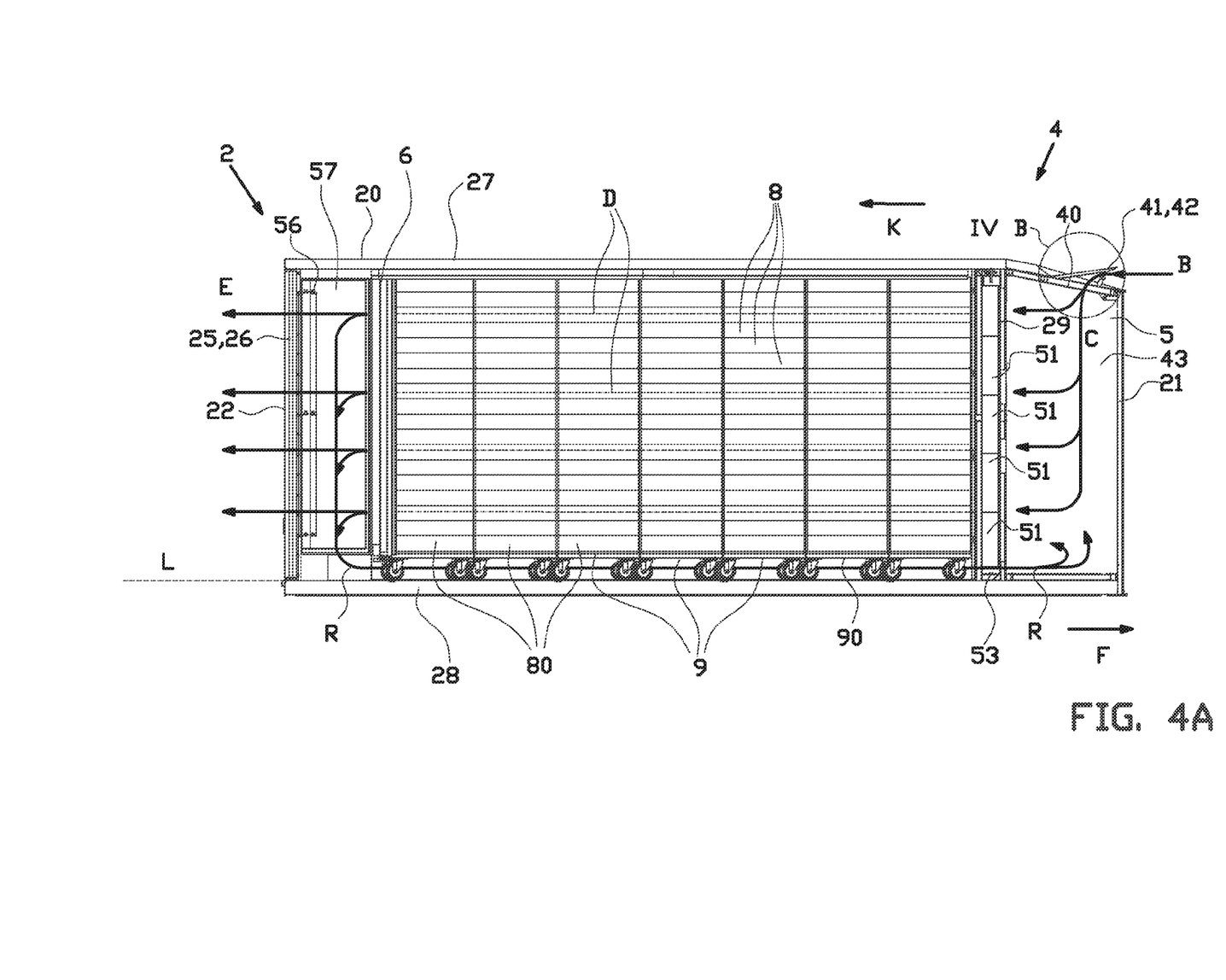
FIG. 4A shows a side view of the transport system of FIG. 2.
Figure 4B:
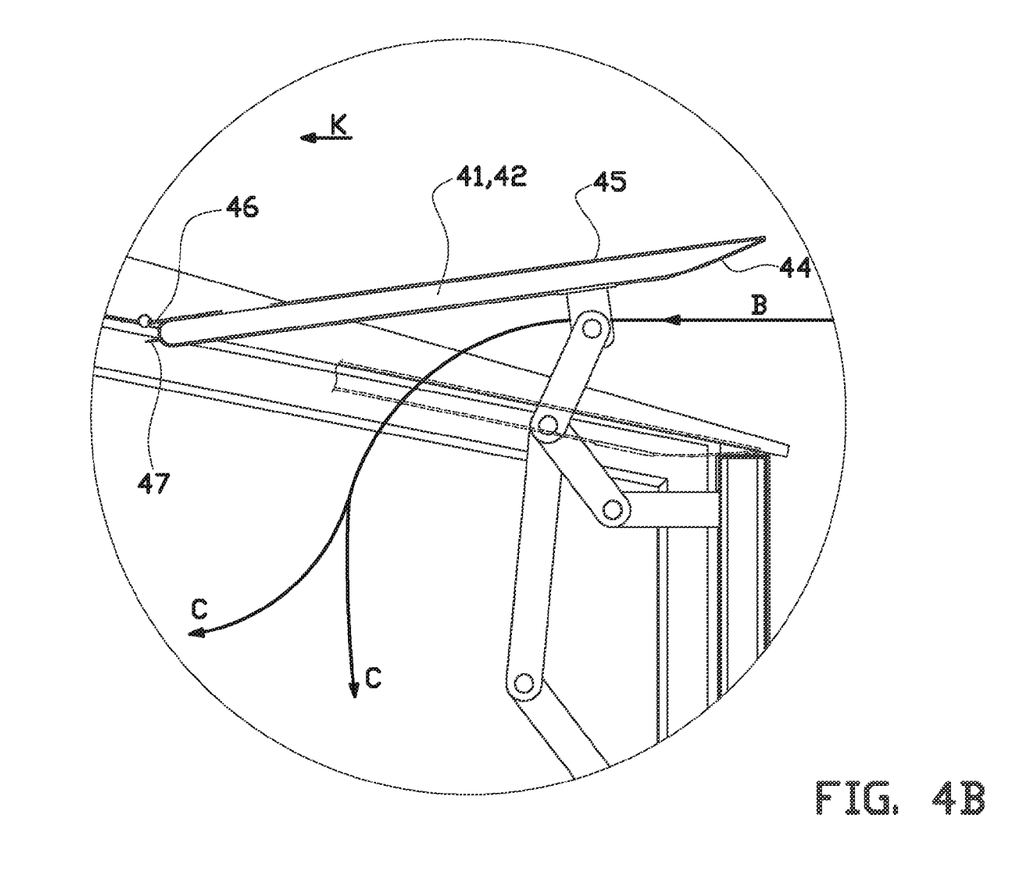
FIG. 4B shows a detail of the side view of FIG. 4A according to the circle IV B in FIG. 4A.

As shown in FIGS. 2, 3 and 4A, the ventilation system 4 is provided with an air inlet 40 and two inlet flaps 41, 42 which can be selectively operated to open, partly close or completely close off the air inlet 40. As best seen in FIGS. 4A and 4B, the inlet flaps 41, 42, in the open or partly closed position, are directed forwards into the forward driving direction F to deflect the outside air flowing overhead the cabin 11, as schematically indicated with airflow B, into the air inlet 50. As shown in FIG. 4B, the inlet flaps 41, 42 are provided with hinges 47 at the trailing end thereof with respect to the forward driving direction F. The inlet flaps 41, 42 each comprise a substantially flat upper surface 45 that faces away from the machine chamber 5 and a bottom surface 44 that faces towards the machine chamber 5. The bottom surface 44 is substantially parallel to the upper surface 45 except for the part near the leading edge of the inlet flap 41, 42. The part of the bottom surface 44 near the leading edge chamfers towards the leading edge to reduce the drag of the leading edge in the forward driving direction F.

The chamfer in the bottom surface 44 optimizes the aerodynamic profile or cross sections of the inlet flaps 41, 42. In the open position of the flaps 41, 42, the chamfer reduces the drag generated by the flaps 41, 42 by cleanly dividing the airflow B overhead the cabin 11 of the transport vehicle 1 into an airflow C that is deflected into the machine chamber 5 and an airflow (not shown) that flows overhead the top 27 of the transport body 20. As schematically indicated with dotted lines in FIG. 4B, the chamfered part of the bottom surface 44 allows for the inlet flaps 41, 42 to be moved into a closed position in which the upper surface 45 lies substantially flush with top 27 of the transport body 20. This further eliminates drag when the inlet flaps 41, 42 are closed and prevents the outside airflow B and precipitation from entering the machine chamber 5 and subsequently the transport compartment 3. This is particularly relevant during cold external conditions, when the amount of external airflow B to be taken in has to be reduced or minimized.

At the trailing edge, near the hinges 46, the inlet flaps 41, 42 are further provided with a rearwardly extending sealing edge 47 that prevents precipitation from entering the machine chamber 5 through at the hinges 46. Furthermore, the sealing edge 47 can prevent snow or ice from jamming the hinges 46. When compared to butterfly valves which are conventionally used to regulate the inflow of air, the aerodynamically optimized inlet flaps 41, 42 furthermore provide a larger intake area, thereby increasing the free airflow B that is deflected into the machine chamber 5.

The airflow B is directed via the air inlet 40 into the machine chamber 5, as indicated with airflow C. The ventilation system 4 comprises an air distribution unit for collecting and conditioning the airflow C in the machine chamber 5 and for subsequently distributing the airflow C to the transport compartment 3. The air distribution unit 43 is provided with heat-exchangers, such that the air can be heated or cooled to the optimal temperature. Optionally, the air distribution unit 43 is also arranged for treating and recirculating used air that is returned from the transport compartment 3.

The ventilation system 4 further comprises a plurality of fans 51 in the intermediate wall 29. The fans 51 are arranged to draw air from the air distribution unit 43 and to convert said air into an airflow that is propagated into the transport compartment 3 in a direction that is—at least initially—substantially parallel to the longitudinal direction L of the transport body 20, as indicated schematically with airflow D in FIG. 4A. In the exemplary embodiment as shown in FIG. 7, the fans 51 are placed in vertical alignment above each other so as to cover the entire height of transport compartment 3. The airflow D generated by the fans 51 is preferably a laminar airflow.

Figure 8:
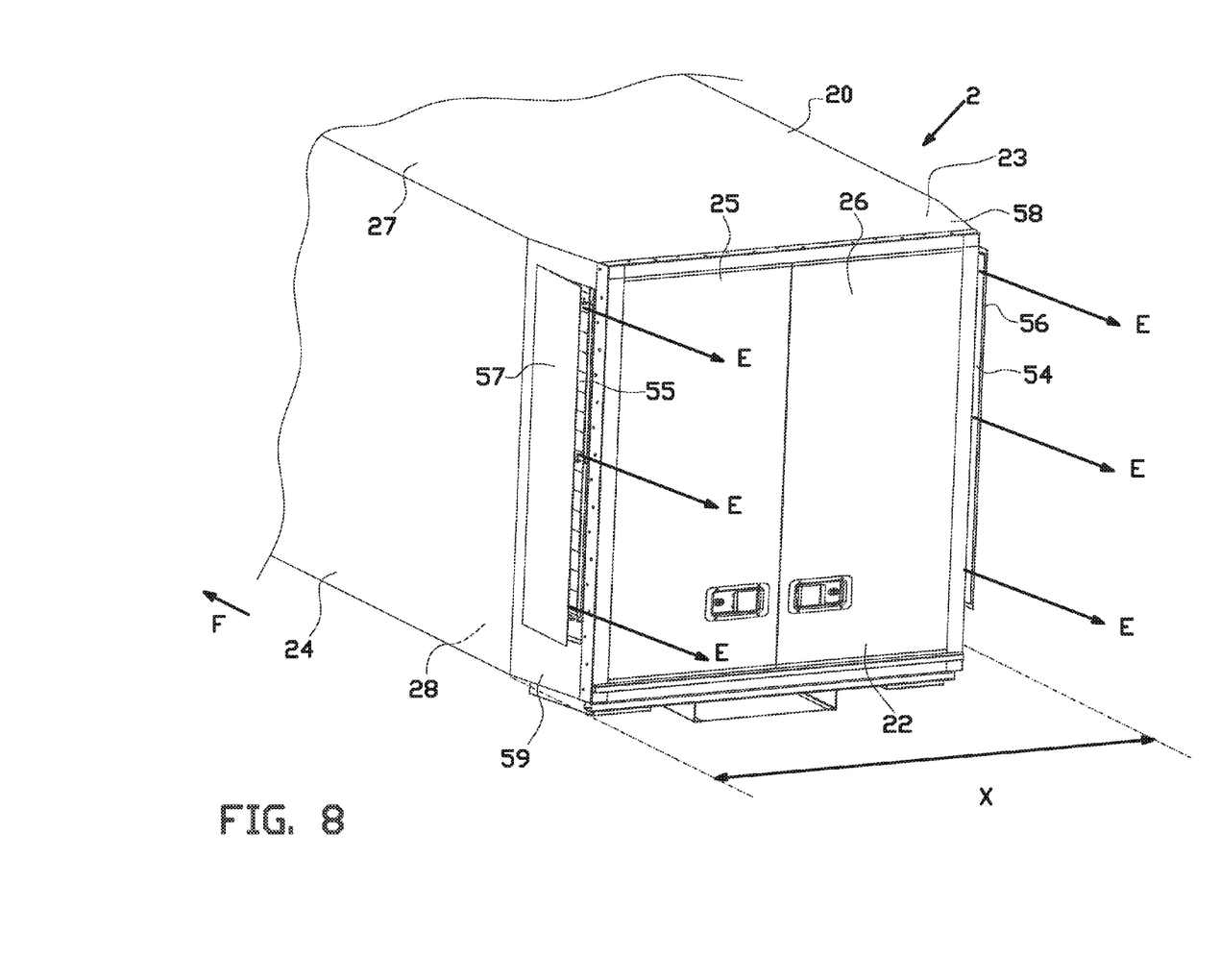
FIG. 8 shows an isometric view of the rear of the transport system according to FIG. 2.

As shown in FIG. 8, the ventilation system 5 is provided with a first air outlet 54 in the first sidewall 23 and a second air outlet 55 in the second sidewall 24, near the rear wall 22 of the transport body 20. In this exemplary embodiment, the air outlets 54, 55 are shaped as vertically elongate gaps in the sidewalls 23, 24, preferably extending along substantially the entire height of the transport body 20 between the top 27 and the bottom 28. Similarly to the air inlet 50, the air outlets 54, 55 are provided with outlet flaps 56, 57 for selectively opening, partly closing or completely closing off the respective air outlets 54, 55. Used air from within the transport compartment 3 can be discharged through the air outlets 54, 55, as schematically indicated with airflow E.

As best seen in FIGS. 3 and 8, the sidewalls 23, 24 are connected to or transition into the rear wall 22 of the transport body 20 via two tapering surfaces 58, 59 which taper or converge inwardly with respect to the outer width X of the transport body 20. The tapering surfaces 58, 59 extend towards each other under an oblique angle with respect to the mirror-symmetrical plane P of the transport body 20, which angle, in this example, is approximately ten degrees. As a result, the width of the rear wall 22 and an optional cantilever tail lift attached thereto (not shown), can be reduced. The air outlets 54, 55 and the outlet flaps 56, 57 are located within said inwardly tapering surfaces 58, 59 such that they are recessed with respect to the outer width X of the transport body 20, yet outside of the dimensions of the rear wall 22 and the optional tail lift. The airflow E from the air outlets 54, 55 can thus be freely discharged without being obstructed by the rear wall or the optional tail lift. In this recessed position, the outlet flaps 56, 57 can be opened fully without extending beyond the outer width X of the transport body 20. In other words, in their open position, the outlet flaps 56, 57 are fully comprised within the outer width X of the transport body 20. In particular, the oblique angle under which the inwardly tapering surfaces 58, 59 extend is equal or greater than the maximum angle of the outlet flaps 56, 57 with respect to said surfaces 58, 59 when they are fully opened.

Part of the airflow D that flows through the transport compartment 3 is returned to the machine chamber via return channels, to be conditioned in the air distribution unit 43 for recirculation into the transport compartment 3. Conventionally, the return channels are integrated into the sidewalls 23, 24, the top 27 or the bottom 28 of the transport body 20. This however causes irregularities in the otherwise flat surfaces of the transport compartment 3. Such irregularities can start to collect dirt and other contaminations, and might additionally be hard to clean.

Therefore, in the preferred embodiment of the invention, the return channels are defined by the interaction between the guides 31-34, the guideways 35, 36 and the trolleys 9.

When the transport compartment 3 is unloaded, for example as shown in FIG. 7, the guideways 35, 36 merely act as open tracks for receiving the trolleys 9. However, the platforms 90 of the trolleys 9 are dimensioned such that, when the trolleys 9 are placed in the guideways 35, 36, the platforms 90 of the trolleys 9 substantially seal off the open top end of the guideways 35, 36 against the guides 31-34 at the sides of the guideways 35, 36. The guides 31-34 are substantially continuous, such that air can not escape via the sides of the guideways 35, 36. Thus, in the situation as shown in FIGS. 2 and 4A, the trolleys 9 cooperate with the guides 31-34 to transform the guideways 35, 36 into return channels that run underneath the trolleys 9. At the intermediate wall 29, return openings 53 are provided for allowing the returned air to pass into the machine chamber 5, as schematically indicated with airflow R in FIG. 4A.

Optionally, further return openings (not shown) are provided in the intermediate wall 29 to allow for the drawing of an additional return airflow from the columns 80 of boxes 8 which are closest to the intermediate wall 29. At least part of the airflow D leaving those boxes 8 can immediately be returned to the machine chamber 5 for reuse. The presence of the further return openings can increase or optimize the airflow D through the boxes 8 in said closest columns 80. However, the main airflow D travels in a direction parallel to the direction of convergence K towards the air exit side of the transport compartment 3.

When functionally defining the ventilation system 4, one could distinguish an air entry side at the machine chamber 5 near the front wall 21 of the transport body 20, and an air exit side at or near the rear wall 22 of the transport body 20. The air inlet 40 is arranged for directing the outside airflow B to the air entry side via air distribution unit 43 in the machine chamber 5, as schematically indicated with airflow C. The air exit side is the side of the transport body 20 where the used air is drawn from the transport compartment 3 to be discharged through one of the air outlets 54, 55, as schematically indicated with airflow E, or is returned via the return channels in the guideways 35, 36 as schematically indicated with the airflow R.

In the description below, the method of transporting and ventilating the boxes 8 in the aforementioned transport system 2 is elucidated. It is noted that the boxes 8 can be loaded into or unloaded from the transport compartment 3. Thus, the boxes 8 do not form part of the transport system 2 as such. However, the airflow D through the transport compartment 3 is directly affected by the placement of the boxes 8 in the transport position V within said transport compartment 3. Therefore, the operation of the transport system 2 is explained on the basis of FIGS. 2, 3 and 4A, in which the transport compartment 3 is loaded with a plurality of said boxes 8.

In FIGS. 2, 3 and 4A, the situation is shown wherein each of the guideways 35, 36 has received a row 81, 82 of boxes 8, divided over seven trolleys 9. Each trolley carries two stacks 80 of boxes 8 in the transport position V. In this example, each stack 80 contains eighteen boxes 8. The number can be adjusted depending on the dimensions of the boxes 8 and the height capacity of the transport body 20. The trolleys 9 are moved as far as possible into the guideways 35, 36. The trolleys 9 in the row 91, 92 are placed as close as possible to the directly subsequent trolleys 9, and preferably in abutment with said directly subsequent trolleys 9, to achieve that the stacks 80 of boxes 8 supported on said trolleys 9 form a substantially continuous row 81, 82. In addition, this ensures that the return channels in the guideways 35, 36 are substantially sealed by the platforms 90 of the trolleys 9.

The trolleys 9 are subsequently secured to the securing elements 37 of the guides 31-34. The securing doors 61, 62 are tilted downwards into a vertical position in which they abut the leading stacks 80 on the leading trolley 9 of each guideway 34, 35, as shown in FIG. 2. The securing doors 61, 62 are fixed in said vertical position, preferably by securing them to the securing elements 37 of the guides 31-34. The securing doors 61, 62 prevent that the boxes 8 accidentally move out of the guideways 35, 36 in the longitudinal direction thereof. Furthermore, the securing doors 61, 62 are substantially air-tight and thus act as air-tight sealing elements at the end of the guideways 35, 36.

It is noted that by supporting the two rows 81, 82 of boxes 8 on the trolleys 9 in the V-shaped transport position V, the two rows 81, 82 of boxes 8 define an air entry volume or chamber 68 in-between them that tapers in the direction of convergence K from the air entry side towards the air exit side of the transport compartment 3. In particular, the combined side surfaces of the rows 81, 82 of boxes 8 facing towards the inside of the V-shaped transport position V of the boxes 8 define or bound the air entry chamber 68. The large surface area of these combined surfaces can ensure that the airflow D is equally distributed over all boxes 8. The top 27, the bottom 28 and the intermediate wall 29 further complement the boundaries of the air entry chamber 68. The fans 51 in the intermediate wall 29 debouch into the air entry chamber 68 to direct the air from the air distribution unit 43 as a laminar airflow D into the air entry chamber 68.

In the transport position V, the boxes 8 form the main passageway, and preferably the only passageway for the laminar airflow D to pass from the air entry chamber 68 at the air entry side of the transport body 20 to the air exit side of the transport body 20. Thus, the airflow D is forced to cross through the rows 81, 82 of boxes 8 in a transverse direction G with respect to the longitudinal direction L of the transport body 20 and the direction of convergence K of the rows 81, 82. In particular at the last stacks 80 of boxes 8 before the securing doors 61, 62, the securing doors 61, 62 can prevent air from escaping in the longitudinal direction L of the transport body 20 rather than the transverse direction G.

As part of the airflow D inside the transport compartment 3 passes from the air entry chamber 68, through the boxes 8 to the air exit side of the transport body 20, the volume of the airflow D within the air entry chamber 68 is gradually reduced in the direction of convergence K. However, because the volume of the air entry chamber 68 itself is also reduced in the direction of convergence K, the pressure of the airflow D within the air entry chamber 68 can be kept substantially constant or at substantially the same level along the direction of convergence K. Thus, it is ensured that the airflow D not only reaches the more distant stacks 80 of boxes 8 with respect to the intermediate wall 29, but also that the airflow D is able to ventilate said more distant stacks 80 equally well with respect to the closer stacks 80.

Furthermore, as the airflow D crosses the rows 81, 82 of boxes 8 in a transverse direction G, the distance travelled through the boxes 8 is relatively small. In this example, each trolley 9 carries two stacks 80 of boxes 8 in the transverse direction G. Thus, the airflow D only has to pass through two boxes 8 and can remains reasonably fresh and without a significant increase in temperature throughout its passage. The airflow D can therefore be more effectively utilized for ventilation of the livestock in the boxes 8.

In addition, the small distance to be crossed significantly reduces the counter-pressure from 1500 Pascal for conventional transport systems to approximately 100 Pascal for the transport system 2 of the invention. Conventional systems consequently require large generator driven fans operating at 400 Volts and at a power output of at least 10 kilowatt to achieve the minimum ventilation requirements. The lowered counter-pressure in the transport system 2 of the invention allows for the fans 51 to be of the type that can be operated at a low voltage, such as 24 Volts, and at a relatively low power output of 1 to 1.5 kilowatt. A voltage of 24 volts is generally available as an on-board power supply of the truck 1.

When the airflow D leaves the boxes 8 on the outside of the rows 81, 82 with respect to the inner air entry chamber 68, the airflow D is merged again and propagates to the air exit side of the transport body 20. The available space between the rows 81, 82 and the sidewall 23, 24 diverges on the outside of the rows 81, 82, resulting in an underpressure that automatically draws the airflow D towards the air exit side of the transport body 20. This further reduces the counter pressure in the transport system 2. At the air exit side, the airflow D is discharged as airflow E through the air outlets 54, 55 and/or returned as return airflow R via the return channels formed by the trolleys 9 and the guideways 35, 36.

Preferably, the transport compartment 3 is loaded with boxes 8 up to its full capacity so that the air entry chamber 68 is fully defined by the adjoining surfaces of the boxes 8. However, when the transport compartment 3 is not fully loaded, the partial loading can result in a partly defined air entry chamber 68. To prevent the airflow D from escaping from the air entry chamber 68 through such gaps, additional sealing elements can be provided.

Figures 6A, 6B, 6C:
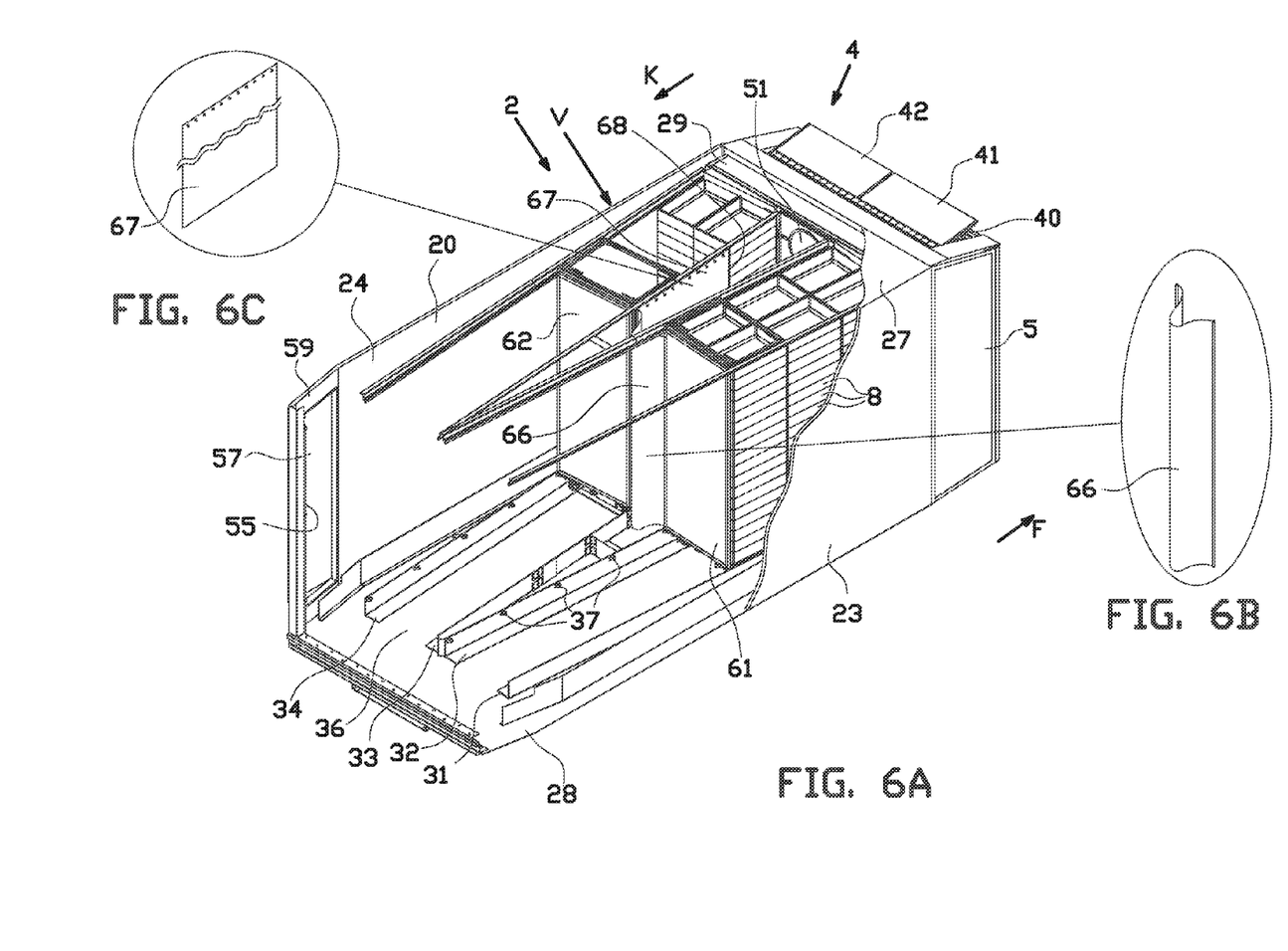
FIG. 6A shows an isometric view of the transport system of FIG. 2 in a partly loaded situation.
FIGS. 6B and 6C show details of FIG. 6A.

FIG. 6A shows a situation of partial loading of the transport compartment 3. In the first row 81, only three trolleys 9 are loaded, each carrying two stacks 80 of boxes 8. In the second row 82, only three trolleys 9 are loaded, two of which are carrying stacks with a reduced height. Both rows 81, 82 are thus of reduced length. In this situation, the transport position V thus has the form of a truncated V-shape. In order to secure and seal the leading stacks 80 of the rows 81, 82, the securing doors 61, 62 are displaced in the longitudinal direction of the guideways 35, 36 until they abut the leading stacks 80 at a position approximately halfway along the length of the guides 31-34. At this position, the second guide 32 and the third guide 33 have not yet fully converged towards each other, thereby leaving a gap in the air entry chamber 68 between the securing doors 61, 62. Thus, air can escape from the air entry chamber 68 directly to the air exit side, without passing through the boxes 8, which can lead to a reduced ventilation of the livestock in said boxes 8.

Therefore, the transport system 2 is provided with an additional first sealing element in the form of a first, vertically extending screen 66, as shown separately in FIG. 6B. The first screen 66 is made of a flexible, air-tight material and is over-dimensioned in a direction transverse to the longitudinal direction L of the transport body 20, such that it is able cover and seal off the gap between the securing doors 61, 62 at any position along the guides 31-34. In this position, halfway along the guides 31-34, the first screen 66 is partly folded. If the first screen 66 is positioned even closer to the intermediate wall 29, the first screen 66 would be expanded into a substantially flat configuration.

At the position of the stacks with the reduced height, the upper part of the air entry chamber 68 is undefined or has a gap. To fix this, the transport system 2 is provided with an additional second sealing element in the form of a second screen 67, as shown separately in FIG. 6B. The second screen 67 can be suspended from the rails 65 at the top 27 of the transport body 20 as shown in FIG. 6A and covers the gap in the air entry chamber 68 caused by the stacks 80 with the reduced height. The second screen 67 is made of an air-tight material. Several second screens 67 can be provided in various dimensions to cover various situations in which one or more stacks 80 are of reduced height.

In a preferred embodiment, the guides 31-34 are detachably mounted to the bottom 28 of the transport body 20, such that, when they are removed, all that remains is a substantially flat bottom 28. The surface of said bottom 28 is less likely to collect dirt or other contaminations and can be cleaned easily and hygienically. Moreover, because the return channels are formed by the guides 31-34 and the trolleys 9, there is no need for integrating return channels in any surface or wall of the transport body 20, such that all surfaces and walls can be optimized for hygiene.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. Transport system for transporting livestock, wherein the transport system comprises a transport compartment with an elongate transport body that defines the internal space of the transport compartment, an air entry side and an air exit side, wherein the transport system further comprises a ventilation system for supplying air to the transport compartment at the air entry side, wherein the transport system is provided with positioning elements which are arranged for receiving and holding a plurality of boxes for said livestock in a transport position in the transport compartment between the air entry side and the air exit side of the transport compartment, wherein the positioning elements are arranged to fix the boxes in the transport position during transport in a first row and a second row that converge towards each other in a direction of convergence under mutually opposite, oblique angles with respect to the longitudinal direction of the transport body from the air entry side towards the air exit side of the transport compartment, wherein, in the transport position, the two rows of boxes at least partly define an air entry chamber in-between them that tapers in the direction of convergence, wherein the ventilation system is provided with an air inlet that is arranged to direct air into the air entry chamber in the direction of convergence.

2. Transport system according to claim 1, wherein the positioning elements comprise a first guide and a second guide arranged in a mutually parallel and spaced apart relationship and a third guide and a fourth guide arranged in a mutually parallel and spaced apart relationship, wherein the first guide and the second guide define the first guideway for receiving the first row of boxes and wherein the third guide and the fourth guide define the second guideway for receiving the second row of boxes.

3. Transport system according to claim 2, wherein the boxes are arranged to be placed on trolleys, wherein each trolley is provided with a platform which is dimensioned to substantially seal off the guideways at the position of trolleys, wherein the guideways are arranged for, in cooperation with said trolleys, forming a return channel through which air can be returned from the air exit side to the air entry side.

4. Transport system according to claim 2, wherein the guides are detachably mounted, wherein, after removal of the guides, the transport compartment is left with a substantially flat bottom surface.

5. Transport system according to claim 1, wherein the boxes are arranged to be permeable to air, wherein, in the transport position, the boxes form the main passageway for the air to flow from the air entry side to the air exit side of the transport compartment.

6. Transport system according to claim 1, wherein, apart from where the boxes define the air entry chamber, the transport compartment is provided with substantially air-tight sealing elements for substantially sealing off remaining gaps between the air entry chamber and the air exit side.

7. Transport system according to claim 1, wherein the rows are arranged in a V-shaped transport position or a mirror-symmetrical V-shaped transport position.

8. Transport system according to claim 1, wherein the transport body is substantially mirror-symmetrical about an upright mirror-symmetrical plane extending in the longitudinal direction of the transport body, wherein the first row and the second row are mirror-symmetrically arranged on opposite sides of the mirror-symmetrical plane of the transport body.

9. Transport system according to claim 1, wherein, in the transport position, the angle of convergence between the rows of boxes is in the range of five to twenty-five degrees.

10. Transport system according to claim 1, wherein the transport system comprises a transport body that defines the internal space of the transport compartment, wherein the transport body is arranged to be placed on a chassis of a transport vehicle, wherein the transport body comprises, with respect to the forward driving direction of the transport vehicle, a front wall, a rear wall and mutually parallel sidewalls extending between the front wall and the rear wall, wherein the air entry side of the transport compartment is located at or near the front wall and wherein the air exit side of the transport compartment is located at or near the rear wall.

11. Transport system according to claim 10, wherein the air inlet is arranged at or near the air entry side of the transport compartment, wherein the transport system is provided with an air inlet flap, wherein the inlet flap is moveable between an open and closed position for opening and closing the air inlet, wherein, in the closed position, the upper surface of the air inlet flap lies substantially flush with the top of the transport compartment.

12. Transport system according to claim 11, wherein the air inlet flap has a leading edge which is arranged to face into the forward driving direction of the transport vehicle, wherein the bottom surface of the air inlet flap is provided with a chamfer towards the leading edge of the inlet flap to reduce the drag of the leading edge in the forward driving direction.

13. Transport system according to claim 10, wherein the transport system is further provided with a first air outlet and a second air outlet for drawing air from the air exit side of the transport compartment, wherein the air outlets are shaped as elongated openings in the sidewalls, wherein the elongated openings extend vertically between the bottom and the top of the transport compartment over a substantial part of the height or substantially the entire height of the transport compartment.

14. Transport system according to claim 10, wherein the sidewalls define the outer width of the transport body, and wherein, at the transition from the sidewalls to the rear wall, the transport body is provided with surfaces that taper inwards with respect to the width of the transport body.

15. Transport system according to claim 14, wherein the transport system is further provided with a first air outlet and a second air outlet for drawing air from the air exit side of the transport compartment, wherein the air outlets are positioned at the inwardly tapering surfaces of the transport body.

16. Transport system according to claim 14, wherein the transport system comprises a first outlet flap and second outlet flap at the first air outlet and the second air outlet, respectively, wherein the first outlet flap and the second outlet flap are moveable between an open and closed position for opening and closing the respective air outlets, wherein, in the open position, the outlet flaps are fully comprised within the outer width of the transport body.

17. Transport vehicle comprising a chassis and the transport system according to claim 1 mounted on top of said chassis.

* * * * *

UNITED STATES PATENT AND TRADEMARK OFFICE
CERTIFICATE OF CORRECTION

PATENT NO. : 10,172,328 B2
APPLICATION NO. : 14/894790
DATED : January 8, 2019
INVENTOR(S) : Gerrit Van Der Linde

Page 1 of 1

It is certified that error appears in the above-identified patent and that said Letters Patent is hereby corrected as shown below:

On the Title Page (73) Assignee: HERRING GROUP B.V.
Should read:
(73) Assignee: HEERING GROUP B.V.

Signed and Sealed this
Twenty-sixth Day of March, 2019

Andrei Iancu
*Director of the United States Patent and Trademark Office*